(12) United States Patent
Brod

(10) Patent No.: US 6,283,472 B1
(45) Date of Patent: Sep. 4, 2001

(54) SYSTEM FOR AUTOMATIC DISPOSAL OF CANCELED PAPER OUTPUT

(75) Inventor: Eric L. Brod, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/567,542

(22) Filed: May 5, 2000

(51) Int. Cl.[7] .................................................. B65H 29/00
(52) U.S. Cl. ........................... 271/279; 271/288; 271/298
(58) Field of Search .................................... 271/279, 288, 271/298; 270/52.04, 58.07, 58.09; 414/789.9, 790.9

(56) References Cited

U.S. PATENT DOCUMENTS

| | | |
|---|---|---|
| Re. 37,197 * | 5/2001 | Iida et al. ........................ 271/298 X |
| 4,083,550 | 4/1978 | Pal . |
| 4,330,200 | 5/1982 | Kikuchi et al. . |
| 4,561,765 * | 12/1985 | Masuda ............................ 271/288 X |
| 4,696,466 | 9/1987 | Yamasaki et al. . |
| 5,098,074 | 3/1992 | Mandel et al. . |
| 5,104,106 | 4/1992 | Shido et al. . |
| 5,328,169 | 7/1994 | Mandel . |
| 6,234,474 * | 5/2001 | Horii et al. ........................... 271/288 |

* cited by examiner

Primary Examiner—David H. Bollinger
(74) Attorney, Agent, or Firm—Robert D. Varitz, PC

(57) ABSTRACT

A system for automatic disposal of an unwanted output includes a print engine for generating a print job having an output; a finishing device connected to said print engine for finishing said print job, wherein said finishing device includes: an intermediate bin for receiving said output from said print engine, and for holding said output until said print job is complete; a waste bin for selectively receiving a cancelled print job; and at least one output bin for receiving a completed print job.

10 Claims, 1 Drawing Sheet

SYSTEM FOR AUTOMATIC DISPOSAL OF CANCELED PAPER OUTPUT

FIELD OF THE INVENTION

This invention relates to printers and copiers and specifically to the automatic disposal of unwanted documents generated by such paper output devices.

BACKGROUND OF THE INVENTION

A variety of printers and copiers are known which have multiple output bins for sorting and collating the paper output generated by these devices. As happens on occasion, a job must be cancelled. Prior art devices require the user to manually remove any partial output of a canceled job from the output bins, and place that job in a waste receptacle, which may or may not include shredding the job.

U.S. Pat. No. 4,083,550, for Multiple copy sorting apparatus, to Pal, granted Apr. 11, 1978, describes an apparatus for sorting multiple copy jobs.

U.S. Pat. No. 4,330,200, for Copying machine with collating apparatus, to Kikuchi et al., granted May 18, 1982 describes a collator for collation of print jobs, one page at a time, which reverts to a normal operation mode following a predetermined time-out.

U.S. Pat. No. 4,696,466, for Sorter for electrophotographic copying machine, to Yamasaki et al., granted Sep. 29, 1987, describes a sensor-equipped sorting device for use with a photocopy machine, wherein an interruption in a copy job rearranges output to specific bins, allowing the original job to be completed without disrupting the original sorting process.

U.S. Pat. No. 5,098,074, for Finishing apparatus, to Mandel et al., granted Mar. 24, 1992, describes a copy machine having an automatic stapler associated therewith.

U.S. Pat. No. 5,104,106, for Sheet sorter with stapler to Shido et al., granted Apr. 14, 1992, describes another copy machine having a stapler associated with a collator.

U.S. Pat. No. 5,328,169 for Mailbox or sorter bin use sensing system, to Mandel, granted Jul. 12, 1994, describes a sorter wherein empty bins are identified by an optical sensor.

None of the known prior art devices has any means for automatically disposing of the paper output from an unwanted print or copy job.

SUMMARY OF THE INVENTION

A system for automatic disposal of an unwanted output includes a print engine for generating a print job having an output; a finishing device connected to said print engine for finishing said print job, wherein said finishing device includes: an intermediate bin for receiving said output from said print engine, and for holding said output until said print job is complete; a waste bin for selectively receiving a cancelled print job; and at least one output bin for receiving a completed print job.

An object of the invention is to provide a system for automatically disposing of unwanted paper output from a print or copy job.

Another object of the invention is to provide a system for automatically shredding such unwanted paper output.

These and other object of the invention will become more fully apparent as the description which follows is read in conjunction with the drawing.

DETAILED DESCRIPTION OF THE PREFERRED EMBODIMENT

Figure 1:
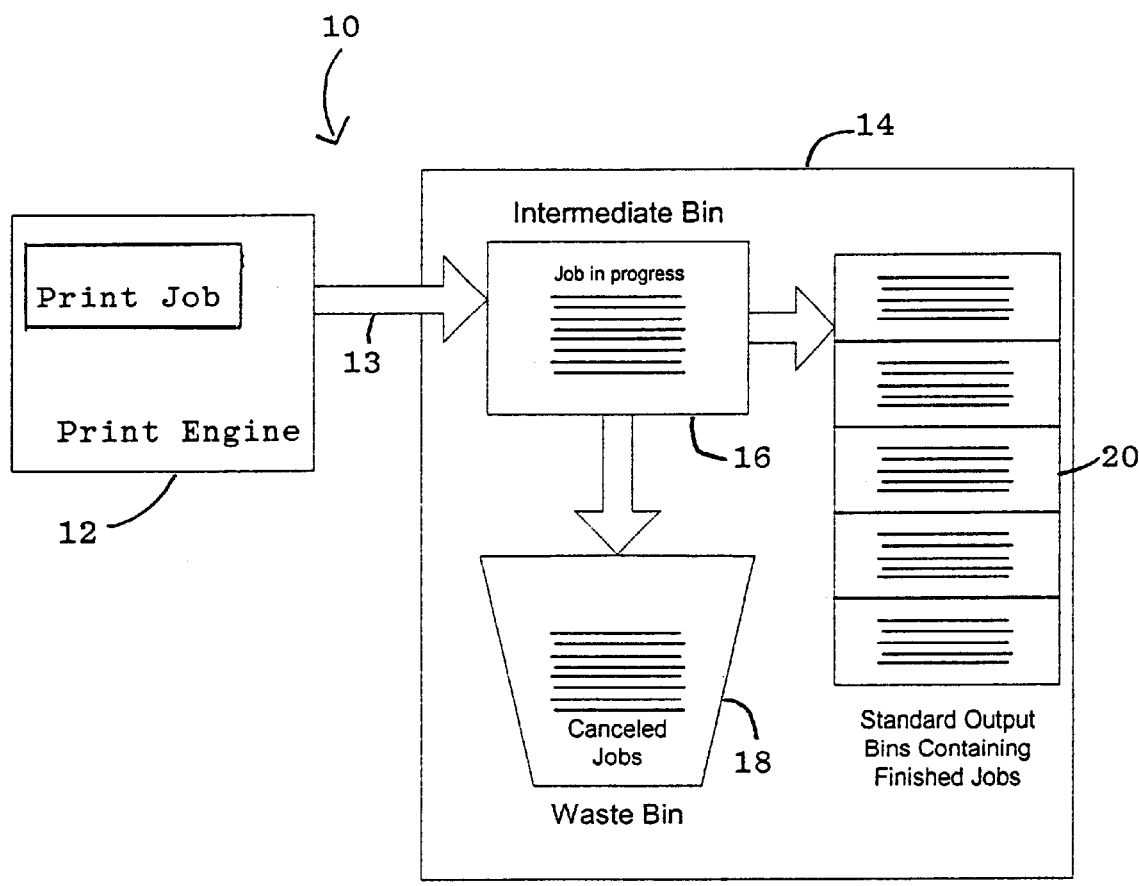
FIG. 1 is a block diagram of a system incorporating the invention.

Manual removal of an unwanted paper output from a printer or copier is the current industry standard. No automatic solutions exist in printer or copier prior art to dispose of such unwanted paper output. Prior inventions regarding output bins require the user to manually remove canceled print or copy jobs.

This invention prevents a canceled print or copy job from occupying space in printer or copier output bins.

Referring now to FIG. 1, a system constructed according to the invention is shown generally at 10. A print engine 12, which may be part of a printer or copier, generates a print job and provides a paper output 13. In known print devices, the paper output is directed into a finishing bin, a finishing collator, or into a finishing device which collates, sorts, and staples. In system 10, paper output 13 is directed towards a finishing device 14, which is connected to print engine 12, which includes an intermediate bin 16. Intermediate bin 16 receives the output from print engine 12. Paper output 13 is held in intermediate bin 16 until the print job is completed, or until a cancel signal is received. When the job is completed, paper output 13 is directed to final, standard output bins 20 for finishing.

If a cancel signal is received, paper output 13 is directed to a waste bin 18, where it may be held for later disposal. In some embodiments of the invention, waste bin 18 may include a shredder to securely dispose of the unwanted paper output.

A user directing a print job to print engine 12 may have options on a print menu unique to system 10. For instance, upon selecting CANCEL on a print menu, also referred to herein as a print control mechanism, the user may be given a choice of selectively directing the paper output of the cancelled print job to a conventional waste bin, or to a secure waste bin, which incorporates a shredder, to provide a secure disposal of a cancelled print job.

The system of the invention immediately frees the bins occupied by the paper output of a cancelled print job, without the necessity for the user to rush to the printer or copier to dispose of the unwanted paper output. This further increases security, as the print job may be directed to a shredder, again without the need for the user to rush to the printer or copier. Both of the aforementioned advantages are particularly relevant to modern, networked-based printers and copiers, which may be located some distance from the user.

although a preferred embodiment of the invention has been disclosed herein, it will be appreciated that further variations and modifications may be made thereto without departing from the scope of the invention as defined in the appended claims.

I claim:

1. A system for automatic disposal of an unwanted output, comprising:

a print engine for generating a print job having an output;

a finishing device connected to said print engine for finishing said print job, wherein said finishing device includes:

an intermediate bin for receiving said output from said print engine, and for holding said output until said print job is complete;

a waste bin for selectively receiving a cancelled print job; and at least one output bin for receiving a completed print job.

2. The system of claim 1 wherein said waste bin includes a shredder.

3. The system of claim 1 wherein said output bin includes multiple bins and a collating mechanism.

4. The system of claim 1 which includes a print control mechanism for controlling said print engine and said finishing device, which includes a cancel option for selectively directing said print job to said waste bin.

5. A system for automatic disposal of an unwanted output, comprising:

a print engine for generating a print job having an output;

a finishing device connected to said print engine for finishing said print job, wherein said finishing device includes:
     an intermediate bin for receiving said output from said print engine, said output from said print engine, and for holding said output until said print job is complete;
     a waste bin for selectively receiving a cancelled print job; and
     at least one output bin for receiving a completed print job; and a print control mechanism for controlling said print engine and said finishing device, which includes a cancel option for selectively directing said print job to said waste bin.

6. The system of claim 5 wherein said waste bin includes a shredder.

7. The system of claim 5 wherein said output bin includes multiple bins and a collating mechanism.

8. A system for automatic disposal of an unwanted output, comprising:

a print engine for generating a print job having an output;

a finishing device connected to said print engine for finishing said print job, wherein said finishing device includes:
     an intermediate bin for receiving said output from said print engine, and for holding said output until said print job is complete;
     a waste bin, including a shredder, for selectively receiving a cancelled print job; and
     at least one output bin for receiving a completed print job.

9. The system of claim 8 wherein said output bin includes multiple bins and a collating mechanism.

10. The system of claim 8 which includes a print control mechanism for controlling said print engine and said finishing device, which includes a cancel option for selectively directing said print job to said waste bin.

* * * * *